United States Patent
Mastrocola et al.

(10) Patent No.: US 12,352,211 B1
(45) Date of Patent: Jul. 8, 2025

(54) DUAL PUMP ELECTRIFIED FUEL SYSTEM WITH PARALLELISM

(71) Applicant: Hamilton Sundstrand Corporation, Charlotte, NC (US)

(72) Inventors: Naison E. Mastrocola, Goshen, CT (US); Ryan Prescott Susca, Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/590,223

(22) Filed: Feb. 28, 2024

(51) Int. Cl.
*F02C 7/236* (2006.01)
*F02C 9/28* (2006.01)

(52) U.S. Cl.
CPC ............... *F02C 7/236* (2013.01); *F02C 9/28* (2013.01); *F05D 2240/35* (2013.01)

(58) Field of Classification Search
CPC .... F02C 7/236; F02C 7/22; F02C 7/32; F02C 9/26; F02C 9/30; F02C 9/32; F02M 37/18
See application file for complete search history.

(56) References Cited

U.S. PATENT DOCUMENTS

| | | | |
|---|---|---|---|
| 3,946,551 A | 3/1976 | Linebrink et al. | |
| 4,864,815 A * | 9/1989 | Cygnor | F02C 7/26 60/734 |
| 4,915,593 A * | 4/1990 | Cygnor | F02C 7/26 417/245 |
| 5,118,258 A * | 6/1992 | Martin | F02C 7/236 60/734 |
| 5,168,704 A * | 12/1992 | Kast | F02C 9/48 60/420 |
| 6,971,373 B2 | 12/2005 | Mudway et al. | |
| 7,401,461 B2 * | 7/2008 | Eick | F23R 3/28 60/734 |
| 8,951,021 B2 | 2/2015 | Hutto, Jr. | |
| 9,353,688 B2 * | 5/2016 | Futa | F02C 7/22 |
| 9,885,287 B2 * | 2/2018 | Striker | F02C 7/224 |
| 10,502,138 B2 * | 12/2019 | Reuter | F02C 9/263 |
| 10,669,943 B2 | 6/2020 | Weir et al. | |
| 11,060,461 B2 | 7/2021 | Turney et al. | |
| 11,236,682 B2 | 2/2022 | Veilleux, Jr. et al. | |
| 11,629,643 B1 | 4/2023 | Susca | |
| 11,629,652 B2 | 4/2023 | Reuter et al. | |
| 11,828,233 B2 | 11/2023 | Stoicescu et al. | |
| 2009/0211558 A1* | 8/2009 | Anson | F02C 7/236 123/495 |
| 2010/0089025 A1* | 4/2010 | Baker | F02C 9/30 137/565.29 |
| 2010/0293919 A1* | 11/2010 | Poisson | F01D 19/00 60/734 |

(Continued)

*Primary Examiner* — Alain Chau
(74) *Attorney, Agent, or Firm* — CANTOR COLBURN LLP

(57) ABSTRACT

A fuel delivery system for a gas turbine engine includes a fuel source and a main fuel pump configured to deliver a first flow of fuel to a combustor assembly of the gas turbine engine under a first fuel demand operating condition of the gas turbine engine. A secondary fuel pump is arranged in a fluidly parallel relationship with the main fuel pump. The secondary fuel pump is configured to deliver a second flow of fuel to the combustor assembly under a fuel demand second operating condition, different from the first fuel demand operating condition of the gas turbine engine.

20 Claims, 5 Drawing Sheets

(56) References Cited

U.S. PATENT DOCUMENTS

| | | | |
|---|---|---|---|
| 2012/0234014 A1* | 9/2012 | Reuter | F02C 9/263 |
| | | | 60/773 |
| 2012/0234015 A1* | 9/2012 | Reuter | F02C 7/236 |
| | | | 60/734 |
| 2014/0053927 A1 | 2/2014 | Podgorski et al. | |
| 2014/0196459 A1* | 7/2014 | Futa | F02C 7/22 |
| | | | 60/734 |
| 2016/0076452 A1* | 3/2016 | Striker | F02C 7/224 |
| | | | 60/734 |
| 2016/0146108 A1* | 5/2016 | Yates | F02C 7/236 |
| | | | 415/124.1 |
| 2017/0292451 A1* | 10/2017 | Reuter | F02C 7/22 |
| 2018/0050812 A1* | 2/2018 | Ribarov | F02C 7/236 |
| 2019/0112987 A1* | 4/2019 | O'Rorke | F02K 3/10 |
| 2020/0191058 A1* | 6/2020 | Turney | F02C 7/236 |
| 2020/0300169 A1* | 9/2020 | Turney | F02C 7/236 |
| 2021/0079848 A1* | 3/2021 | Cocks | F02C 7/236 |
| 2021/0102517 A1* | 4/2021 | Susca | F02C 7/26 |
| 2023/0064430 A1* | 3/2023 | Dupeu | F02C 7/236 |
| 2023/0235701 A1 | 7/2023 | O'Rorke et al. | |
| 2023/0383736 A1 | 11/2023 | O'Rorke et al. | |
| 2023/0417190 A1* | 12/2023 | Mastrocola | F04B 49/007 |
| 2024/0263589 A1* | 8/2024 | Snodgrass | F02C 7/236 |

* cited by examiner

DUAL PUMP ELECTRIFIED FUEL SYSTEM WITH PARALLELISM

BACKGROUND

Exemplary embodiments pertain to the art of gas turbine engines, and more particularly to fuel delivery systems of gas turbine engines.

Fuel delivery systems for gas turbine engines utilize a variety of pumps, often driven by a gearbox that extracts power from operation of the gas turbine engine to drive the pumps. A common configuration is a fuel delivery system having dual positive displacement pumps that are both coupled to a fixed input, the speed of which tracks with engine RPM, in particular to the RPM of the engine shaft to which the pumps are connected via the gearbox.

The pump elements are typically sized to meet the requirements of engine start, the condition which places the greatest demand on the fuel delivery system. This excess pump capacity, however, is wasted at other operating conditions, such as cruise operations where demands on the fuel delivery system are lower. Demands on commercial fuel delivery systems continue to grow in terms of efficiency, cost and reliability. Thus, the art would welcome a solution to improve efficiency of the fuel delivery system across operating conditions.

BRIEF DESCRIPTION

In one exemplary embodiment, a fuel delivery system for a gas turbine engine includes a fuel source and a main fuel pump configured to deliver a first flow of fuel to a combustor assembly of the gas turbine engine under a first fuel demand operating condition of the gas turbine engine. A secondary fuel pump is arranged in a fluidly parallel relationship with the main fuel pump. The secondary fuel pump is configured to deliver a second flow of fuel to the combustor assembly under a second fuel demand operating condition, different from the first fuel demand operating condition of the gas turbine engine.

Additionally or alternatively, in this or other embodiments the secondary fuel pump is electrically driven.

Additionally or alternatively, in this or other embodiments the first operating condition is cruise operation of the gas turbine engine.

Additionally or alternatively, in this or other embodiments the second operating condition is one of engine start or sub-cruise operation of the gas turbine engine.

Additionally or alternatively, in this or other embodiments a flow regulating device is configured to selectably control the flow of fuel from the main fuel pump and the secondary fuel pump.

Additionally or alternatively, in this or other embodiments operation of the main fuel pump is stopped when operation of the secondary fuel pump is started.

Additionally or alternatively, in this or other embodiments the main fuel pump is mechanically driven via a gearbox of the gas turbine engine.

In another exemplary embodiment, a gas turbine engine and fuel delivery system includes a gas turbine engine, including a turbine and a combustor where fuel is combusted to drive the turbine via a flow of combustion products. A fuel delivery system is operably connected to the gas turbine engine and includes a fuel source and a main fuel pump configured to deliver a first flow of fuel to the combustor under a first fuel demand operating condition of the gas turbine engine. A secondary fuel pump is arranged in a fluidly parallel relationship with the main fuel pump. The secondary fuel pump is configured to deliver a second flow of fuel to the combustor under a second fuel demand operating condition, different from the first fuel demand operating condition of the gas turbine engine.

Additionally or alternatively, in this or other embodiments the secondary fuel pump is electrically driven.

Additionally or alternatively, in this or other embodiments the first operating condition is cruise operation of the gas turbine engine.

Additionally or alternatively, in this or other embodiments the second operating condition is one of engine start or sub-cruise operation of the gas turbine engine.

Additionally or alternatively, in this or other embodiments a flow regulating device is configured to selectably control the flow of fuel from the main fuel pump and the secondary fuel pump.

Additionally or alternatively, in this or other embodiments operation of the main fuel pump is stopped when operation of the secondary fuel pump is started.

Additionally or alternatively, in this or other embodiments the main fuel pump is mechanically driven via a gearbox of the gas turbine engine.

In yet another exemplary embodiment, a method of operating a gas turbine engine and fuel delivery system includes operating a gas turbine engine at a first, fuel demand operating condition, delivering a first flow of fuel to a combustor of the gas turbine engine via a main fuel pump, switching operation of the gas turbine engine to a second operating condition different from the first operating condition, and starting operation of a secondary fuel pump arranged in a fluidly parallel relationship with the main fuel pump. The secondary fuel pump is configured to deliver a second flow of fuel to the combustor.

Additionally or alternatively, in this or other embodiments operation of the main fuel pump is stopped when operation of the secondary fuel pump is started.

Additionally or alternatively, in this or other embodiments the secondary fuel pump is electrically driven.

Additionally or alternatively, in this or other embodiments the first operating condition is cruise operation of the gas turbine engine.

Additionally or alternatively, in this or other embodiments the second operating condition is one of engine start or sub-cruise operation of the gas turbine engine.

Additionally or alternatively, in this or other embodiments the main fuel pump is mechanically driven via a gearbox of the gas turbine engine.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
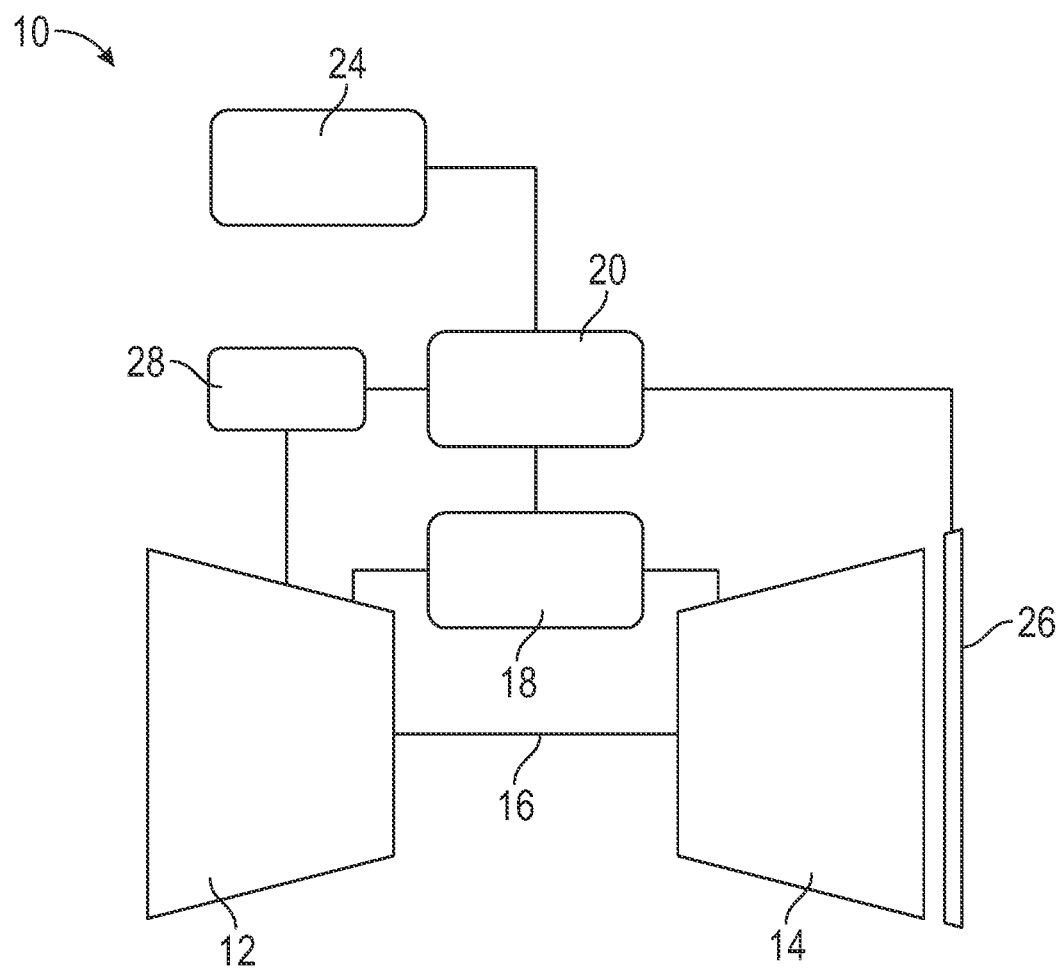
FIG. 1 is a schematic illustration of an embodiment of a gas turbine engine and fuel delivery system through which fuel is delivered to power the gas turbine engine.

An aircraft gas turbine engine system is indicated generally at 10 in FIG. 1. Gas turbine engine system 10 includes a compressor portion 12 operatively coupled to a turbine portion 14 through a shaft 16. A combustor assembly 18 is fluidically connected between the compressor portion 12 and turbine portion 14. A fuel delivery system 20 fluidically connects the combustor assembly 14 with a source of fuel 24. Fuel delivery system 20 may receive fuel directly from source of fuel 24 or, through a compressor stage (not shown) that creates an input pressure for the fuel. In addition to the combustor assembly 18, the fuel delivery system 20 may be operably connected to one or more secondary components, such as an augmentor 26 to deliver a flow of fuel thereto. In some embodiments, a gearbox 28 is operably connected to the gas turbine engine 10 via, for example, the shaft 16 to extract power from the gas turbine engine 10. The fuel delivery system 20 is operably coupled to the gearbox to power components of the fuel delivery system 20.

Figure 2:
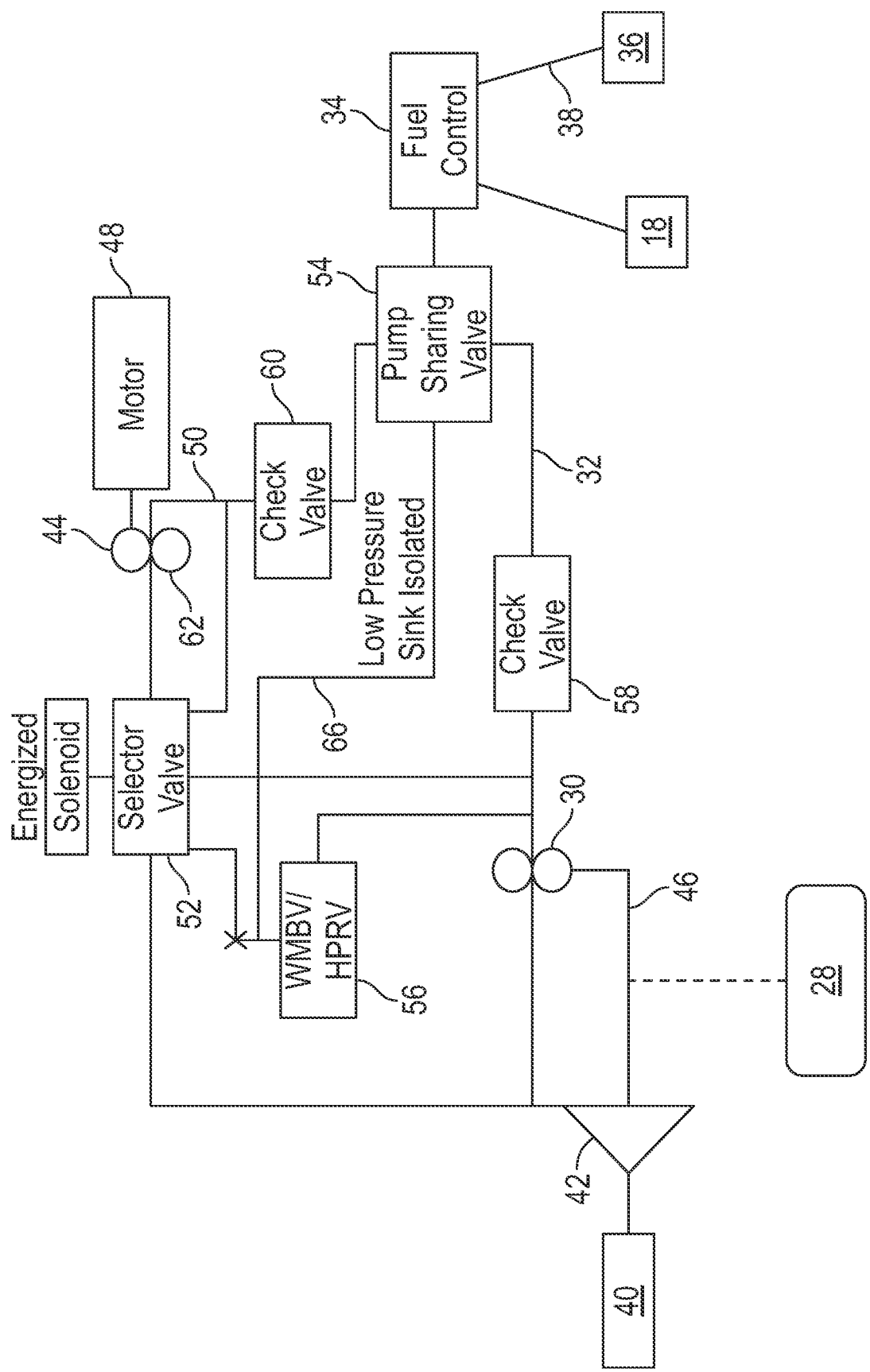
FIG. 2 is a schematic illustration of an embodiment of a fuel delivery system of a gas turbine engine operating in a first mode.

Referring now to FIG. 2, the fuel delivery system 20 will now be described in greater detail. The fuel delivery system 20 includes a main fuel pump 30 that directs fuel to the combustor assembly 18 via a main fuel pathway 32, with a combustor fuel control 34 located along the main fuel pathway 32 to control the flow of fuel to the combustor assembly 18. Additionally, in some embodiments the main fuel pump 30 further directs fuel toward one or more actuation devices 36 via an actuation fuel line 38 to drive operation of the actuation devices 36.

Fuel is introduced to the fuel delivery system 20 from a fuel source 40, such as a fuel tank or the like. The fuel may be initially directed through a boost pump 42 before passing through the main fuel pump 30. Both the main fuel pump 30 and the boost pump 42 are operably connected to the gearbox 28 and are mechanically driven by a pump shaft 46 connected to the gearbox 28. The main fuel pump 30 is sized and configured to deliver fuel to the combustor assembly 18 at a cruise operating condition of the gas turbine engine 10, but is undersized for other operating conditions, such as start and hot day takeoff operating conditions. For delivery of fuel to the combustor assembly 18 at operating conditions other than the cruise operating condition, the fuel delivery system 20 further includes a secondary fuel pump 44, which is driven by an electric motor 48. The secondary fuel pump 44 is configured to deliver fuel to the combustor assembly 18 via a secondary fuel pathway 50 at operating conditions other than the cruise operating condition. For example, at operating conditions such as the start operating condition, the secondary fuel pump 44 is operated, while the main fuel pump 30 is set to a bypass operating mode. At other operating conditions, such as an above cruise operating condition, where a greater fuel flow is needed, the secondary fuel pump 44 is operated to compliment operation of the main fuel pump 30 and provide additional fuel flow to the combustor assembly 18 beyond that which is provided by the main fuel pump 30.

To allow for operating in these various modes and switching between different modes of operation, the fuel delivery system 20 further includes a plurality of valves that interconnect the main fuel pump 30, the secondary fuel pump 44, the main fuel pathway 32 and the secondary fuel pathway 50. These valves include a selector valve 52, a pump sharing valve 54 and a combination windmill bypass valve and high pressure relief valve (WMBV/HPRV) 56. The WMBV/HPRV 56 is selectably switchable between operating as a WMBV or as a HPRV, depending on the operating mode of the fuel delivery system 20. Further, a main check valve 58 may be located along the main fuel pathway 32 downstream of the main fuel pump 30, and a secondary check valve 60 may be located along the secondary fuel pathway 50 downstream of the secondary fuel pump 44. This prevents backward flow toward the pumps 30, 44 along the respective fuel pathways 32, 50. In some embodiments a controller, such as a full authority digital engine control (FADEC) is connected to one or more of the main fuel pump 30, the secondary fuel pump 44, the selector valve 52 the pump sharing valve 54 and the WMBV/HPRV 56 to control the operation thereof.

Referring now to FIGS. 2-5, operation of the fuel delivery system 20 in various operating modes will now be described in greater detail. FIG. 2 illustrates a pre-start condition. In the pre-start condition, the main fuel pump 30 provides little fuel flow due to low rotational speed of the gas turbine engine 10, which drives the main fuel pump 30 and low pump volumetric efficiency. As such, the secondary fuel pump 44 is energized and operated to provide the fuel flow needed at this operating condition. One issue present at this condition is that a breakout torque to start operation of the secondary fuel pump 44 is relatively high. To address this and enable easier starting of the secondary fuel pump 44, the selector valve 52 is energized to port fuel from the main fuel pump 30 to a secondary pump inlet 62 of the secondary fuel pump 44, effectively overcoming the breakout torque by unloading the bearing surfaces of the secondary fuel pump 44. This starting of the secondary fuel pump 44 via flow from the main fuel pump 30 allows the electric motor 48 to be smaller, since the electric motor 48 does not need to be sized to overcome the breakout torque of the secondary fuel pump 44. In the pre-start condition, the secondary fuel pump 44 is able to provide all of the necessary fuel flow to the combustor assembly 18, so the pump sharing valve 54 is positioned at a first position to direct fuel from the secondary fuel pathway 50 toward the combustor assembly 18, while blocking the main fuel pathway 32. Additionally, the WMBV/HPRV 56 is switched to HPRV mode via the selector valve 52.

Figure 3:
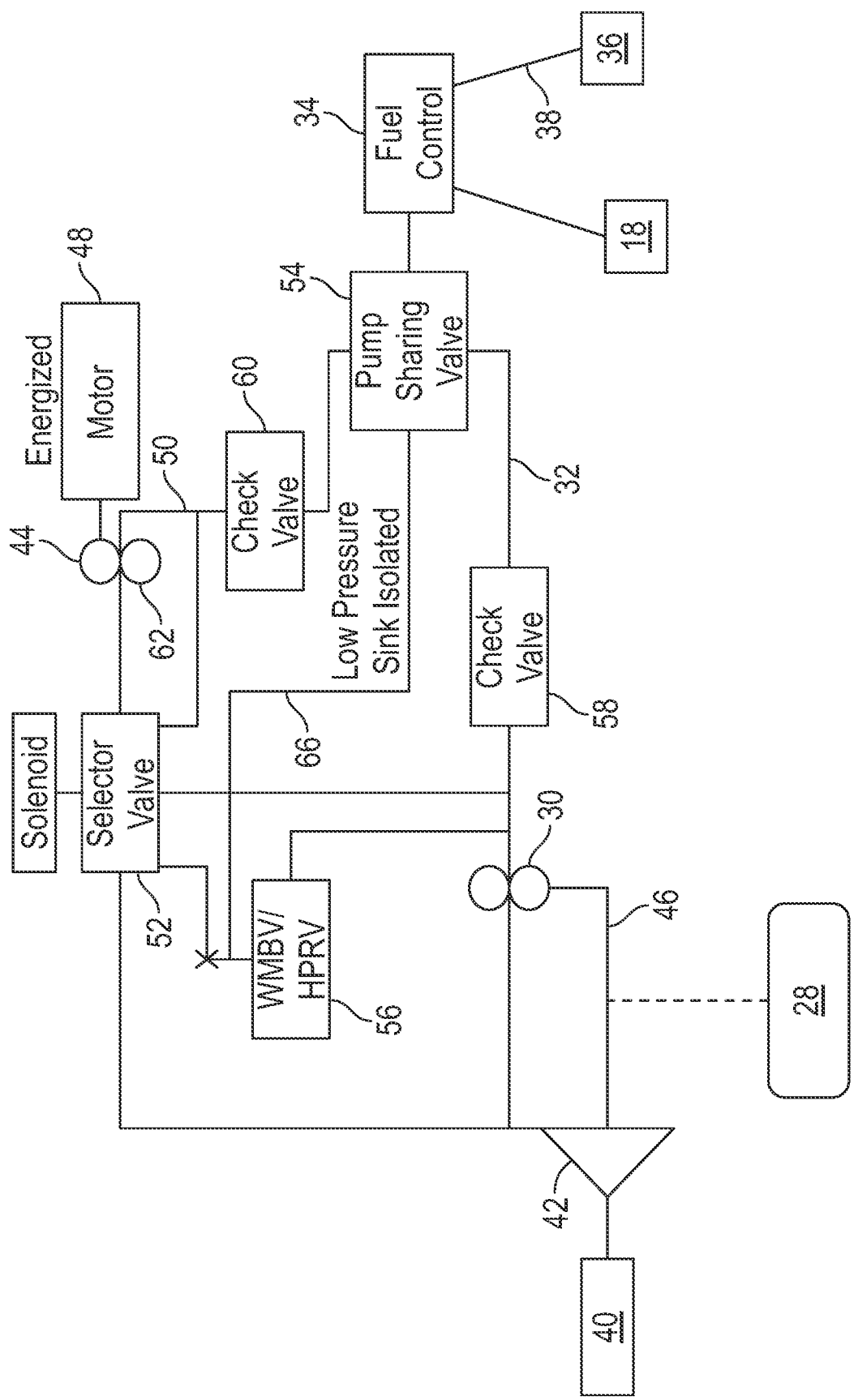
FIG. 3 is a schematic illustration of an embodiment of a fuel delivery system of a gas turbine engine operating in a second mode.

Referring now to FIG. 3, once the gas turbine engine 10 is started, power is increased toward cruise operation. From start operation to a pump switch point at or near cruise operation, the secondary fuel pump 44 provides all of the fuel flow to the combustor assembly 18, and the main fuel pump 30 is operated in a bypass mode. To accomplish this, the WMBV/HPRV 56 is set to WMBV mode causing the main fuel pump 30 to operate in the bypass mode. The selector valve 52 is deenergized to port the main fuel pump 30 to the pump sharing valve 54, and to link the boost pump 42 to the secondary pump inlet 62. In this mode, only the fuel from the secondary fuel pump 44 is directed to the combustor assembly 18.

Figure 4:
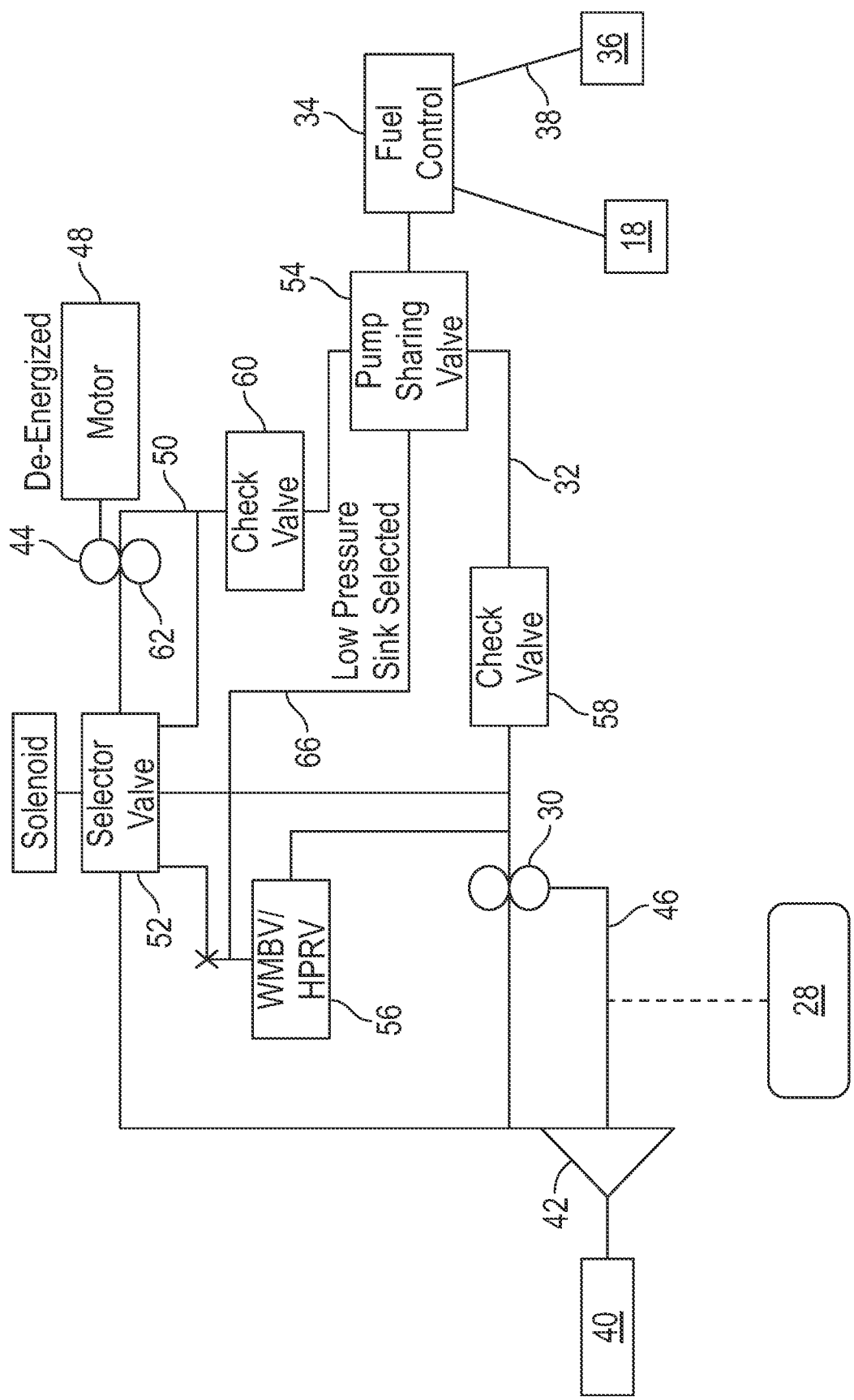
FIG. 4 is a schematic illustration of an embodiment of a fuel delivery system of a gas turbine engine operating in a third mode.
Figure 5:
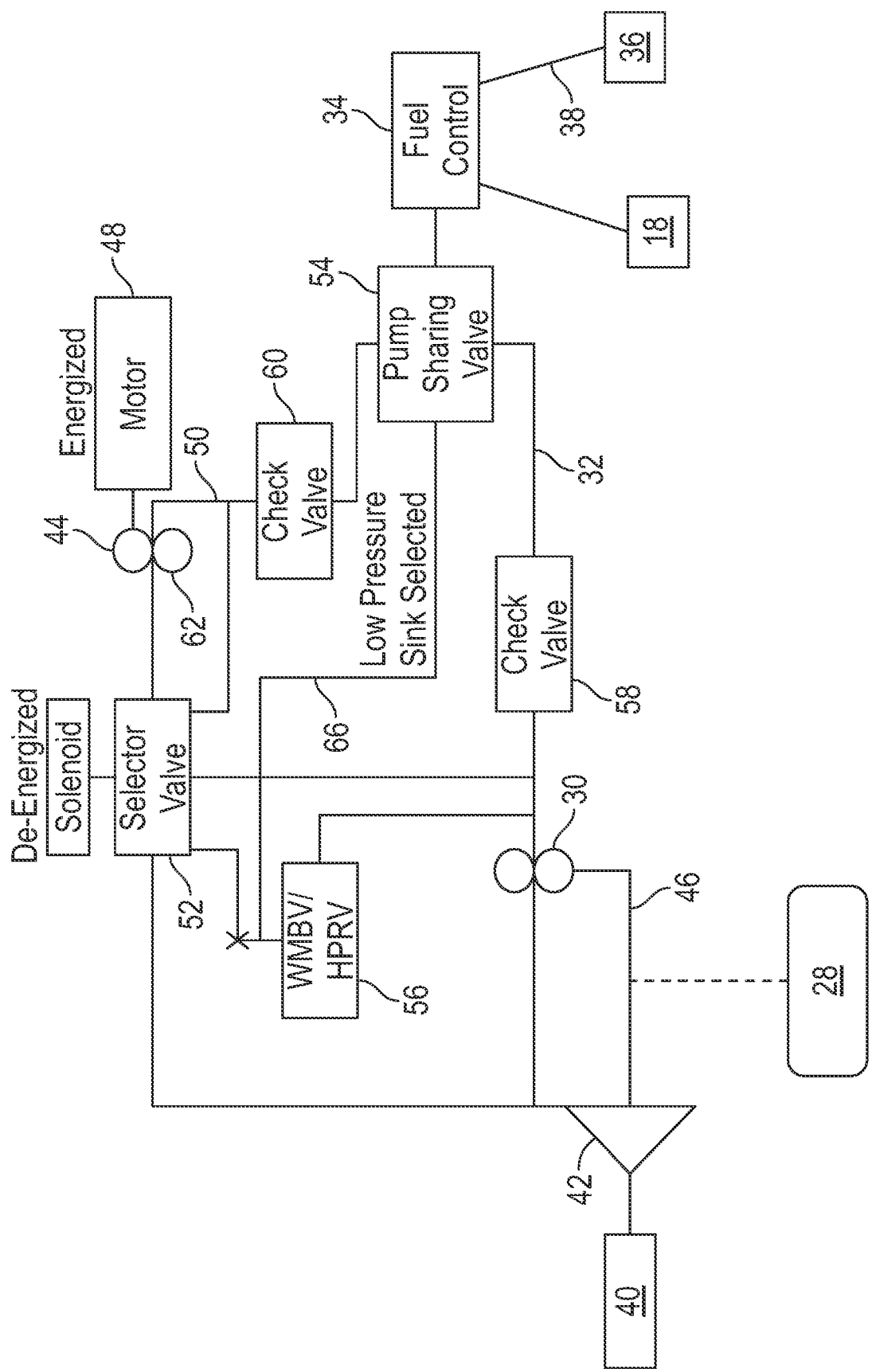
FIG. 5 is a schematic illustration of an embodiment of a fuel delivery system of a gas turbine engine operating in a fourth mode.

Referring now to FIG. 4, at a pump switching operating point, which is at or near the cruise operating point, the main fuel pump 30 is utilized to provide the fuel flow to the combustor assembly 18, and the secondary fuel pump 44 is deactivated. To accomplish this operation, the selector valve 52 is deenergized, porting the main fuel pump 30 to the pump sharing valve 54, and to link the boost pump 42 to the secondary pump inlet 62. The WMBV/HPRV 56 is set to HPRV mode via the selector valve 52 and the pump sharing valve 54. The pump sharing valve 54 is set to a second position, so that fuel flow from the main fuel pump 30 and the main fuel pathway 32 is directed to the combustor assembly 18. Backflow of fuel toward the secondary fuel pump 44 is stopped by the secondary check valve 60. Further, setting the pump sharing valve 54 to the second position links the WMBV/HPRV 56 pressure to a low pressure sink 66.

Referring now to FIG. 6, at operating conditions requiring higher fuel flow than can be provided by the main fuel pump 30, the secondary fuel pump 44, which has a fluidly parallel relationship with the main fuel pump 30, is activated to supplement the fuel flow provided by the main fuel pump 30 to the combustor assembly 18. In this operating mode, t, the selector valve 52 is deenergized, porting the main fuel pump 30 to the pump sharing valve 54, and to link the boost pump 42 to the secondary pump inlet 62. The WMBV/HPRV 56 is set to HPRV mode via the selector valve 52 and the pump sharing valve 54. The pump sharing valve 54 is set to a second position, so that fuel flow from the main fuel pump 30 and the main fuel pathway 32 and fuel flow from the secondary fuel pump 44 along the secondary fuel pathway 50 are directed to the combustor assembly 18.

It is to be appreciated that the operating modes described herein are merely exemplary, and that arranging the main fuel pump 30 and secondary fuel pump 44 is a fluidly parallel relationship controlled through the use of the pump sharing valve 54 and the WMBV/HPRV 56, allows for switching between operation of the main fuel pump 30 and the secondary fuel pump 44, and for supplementing operation of the main fuel pump 30 with operation of the secondary fuel pump 44. This allows for the main fuel pump 30 to be sized and configured for the fuel flow demands of cruise operation, while operation of the secondary fuel pump 44 is utilized for other operating conditions. Sizing of the main fuel pump 30 for cruise operation provides a unique pump sizing and pump efficiency benefit to the fuel delivery system 20.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fuel delivery system for a gas turbine engine, comprising:
    a fuel source;
    a main fuel pump configured to deliver a first flow of fuel to a combustor assembly of the gas turbine engine under a first fuel demand operating condition of the gas turbine engine;
    a secondary fuel pump arranged in a fluidly parallel relationship with the main fuel pump, the secondary fuel pump configured to deliver a second flow of fuel to the combustor assembly under a second fuel demand operating condition, different from the first fuel demand operating condition, of the gas turbine engine; and
    a combination windmill bypass valve and high pressure relief valve (WMBV/HPRV) operably connected to the main fuel pump and the secondary fuel pump, the WMBV/HPRV selectably switchable to operate as a WMBV causing the main fuel pump to operate in a bypass mode, and operate as an HPRV to prevent backflow of the second flow of fuel toward the main fuel pump;
    wherein in the bypass mode, fuel flow from the fuel source is directed to bypass the main fuel pump and only the second flow of fuel from the secondary fuel pump is directed to the combustor assembly.

2. The fuel delivery system of claim 1, wherein the secondary fuel pump is electrically driven.

3. The fuel delivery system of claim 1, wherein the first operating condition is cruise operation of the gas turbine engine.

4. The fuel delivery system of claim 1, wherein the second operating condition is one of engine start or sub-cruise operation of the gas turbine engine.

5. The fuel delivery system of claim 1, further comprising one or more valves configured to selectably control the flow of fuel from the main fuel pump and the secondary fuel pump.

6. The fuel delivery system of claim 1, wherein operation of the main fuel pump is stopped when operation of the secondary fuel pump is started.

7. The fuel delivery system of claim 1, wherein the main fuel pump is mechanically driven via a gearbox of the gas turbine engine.

8. A gas turbine engine and fuel delivery system, comprising:
    a gas turbine engine, including:
        a turbine; and
        a combustor where fuel is combusted to drive the turbine via a flow of combustion products; and
        a fuel delivery system operably connected to the gas turbine engine, including:
            a fuel source;
            a main fuel pump configured to deliver a first flow of fuel to the combustor under a first fuel demand operating condition of the gas turbine engine; and
            a secondary fuel pump arranged in a fluidly parallel relationship with the main fuel pump, the secondary fuel pump configured to deliver a second flow of fuel to the combustor under a second fuel demand operating condition, different from the first fuel demand operating condition, of the gas turbine engine; and a combination windmill bypass valve and high pressure relief valve (WMBV/HPRV) operably connected to the main fuel pump and the secondary fuel pump, the WMBV/HPRV selectably switchable to operate as a WMBV causing the main fuel pump to operate in a bypass mode, and operate as an HPRV to prevent backflow of the second flow of fuel toward the main fuel pump;

wherein in the bypass mode, fuel flow from the fuel source is directed to bypass the main fuel pump and only the second flow of fuel from the secondary fuel pump is directed to the combustor assembly.

9. The gas turbine engine and fuel delivery system of claim 8, wherein the secondary fuel pump is electrically driven.

10. The gas turbine engine and fuel delivery system of claim 8, wherein the first operating condition is cruise operation of the gas turbine engine.

11. The gas turbine engine and fuel delivery system of claim 8, wherein the second operating condition is one of engine start or sub-cruise operation of the gas turbine engine.

12. The gas turbine engine and fuel delivery system of claim 8, further comprising one or more valves configured to selectably control the flow of fuel from the main fuel pump and the secondary fuel pump.

13. The gas turbine engine and fuel delivery system of claim 8, wherein operation of the main fuel pump is stopped when operation of the secondary fuel pump is started.

14. The gas turbine engine and fuel delivery system of claim 8, wherein the main fuel pump is mechanically driven via a gearbox of the gas turbine engine.

15. A method of operating a gas turbine engine and fuel delivery system, comprising:

operating a gas turbine engine at a first, fuel demand operating condition;

delivering a first flow of fuel to a combustor of the gas turbine engine via a main fuel pump;

switching operation of the gas turbine engine to a second operating condition different from the first operating condition; and starting operation of a secondary fuel pump arranged in a fluidly parallel relationship with the main fuel pump, the secondary fuel pump configured to deliver a second flow of fuel to the combustor; and providing a combination windmill bypass valve and high pressure relief valve (WMBV/HPRV) operably connected to the main fuel pump and the secondary fuel pump, the WMBV/HPRV selectably switchable to operate as a WMBV causing the main fuel pump to operate in a bypass mode, and operate as an HPRV to prevent backflow of the second flow of fuel toward the main fuel pump;

wherein in the bypass mode, fuel flow from the fuel source is directed to bypass the main fuel pump and only the second flow of fuel from the secondary fuel pump is directed to the combustor assembly.

16. The method of claim 15, further comprising stopping operation of the main fuel pump when operation of the secondary fuel pump is started.

17. The method of claim 15, wherein the secondary fuel pump is electrically driven.

18. The method of claim 15, wherein the first operating condition is cruise operation of the gas turbine engine.

19. The method of claim 15, wherein the second operating condition is one of engine start or sub-cruise operation of the gas turbine engine.

20. The method of claim 15, wherein the main fuel pump is mechanically driven via a gearbox of the gas turbine engine.

* * * * *